(12) United States Patent
Bode et al.

(10) Patent No.: US 6,212,001 B1
(45) Date of Patent: Apr. 3, 2001

(54) METHOD AND SYSTEM FOR CONTROLLING OPTICAL AMPLIFICATION IN WAVELENGTH DIVISION MULTIPLEX OPTICAL TRANSMISSION

(75) Inventors: Dirk Bode, Nuremberg; Bernd Teichmann, Eckental, both of (DE); Jianhui Zhou, Freehold, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/235,797

(22) Filed: Jan. 22, 1999

(30) Foreign Application Priority Data

Jan. 27, 1998 (EP) .................................................. 98300561

(51) Int. Cl.[7] ................. H01S 3/00; H01S 3/30
(52) U.S. Cl. ........................ 359/341; 359/337; 359/124; 359/160
(58) Field of Search .................................. 359/341, 337, 359/160, 124

(56) References Cited

U.S. PATENT DOCUMENTS 5,909,305 * 6/1999 Kinoshita .............................. 359/341
6,067,187 * 5/2000 Onaka et al. ......................... 359/341

FOREIGN PATENT DOCUMENTS

| 91112133 | 7/1991 | (EP) | ............................... H04J/14/02 |
| 95400053 | 1/1995 | (EP) | ............................... H04B/10/16 |
| 96116724 | 10/1996 | (EP) | ............................... H04J/14/02 |
| PCT/GB96/ 01884 | 8/1996 | (WO) | ............................... H04J/14/02 |

* cited by examiner

*Primary Examiner*—Mark Hellner

(57) ABSTRACT

The present invention relates generally to the field of optical transmission and particularly to a method and a system for controlling optical amplification in wavelength division multiplex optical transmission. WDM systems currently under development will have eighty or more channels, i.e., modulated optical signals with different wavelengths (known as Dense Wavelength Division Multiplexing, DWDM). These DWDM systems are demanding optical amplifiers which, especially considering the cascadation of a plurality of optical amplifiers along the transmission path of the DWDM system, have only very limited tolerances in certain parameters. Among these parameters gain flatness and gain tilt are of special importance. The present invention discloses a method and a system which make use of auxiliary optical signals having a given power level which is equal for all auxiliary signals. Differences in the power levels of the auxiliary signals after optical amplification are used for the control of the optical amplifiers of the WDM system.

20 Claims, 3 Drawing Sheets

METHOD AND SYSTEM FOR CONTROLLING OPTICAL AMPLIFICATION IN WAVELENGTH DIVISION MULTIPLEX OPTICAL TRANSMISSION

CROSS-REFERENCED TO RELATED APPLICATION

This application claims priority of European Patent Application No. 98300561.2, which was filed on Jan. 27, 1998.

TECHNICAL FIELD

The present invention generally relates to the field of optical transmission and particularly to a method and a system for controlling optical amplification in wavelength division multiplex optical transmission.

BACKGROUND OF THE INVENTION

Wavelength division multiplexing (WDM) is being introduced as a means of increasing the capacity of optical fiber transmission systems. In a WDM system, each individual fiber carries a number of optical signals having different wavelengths. When these optical signals are transmitted over long distances, periodic regeneration of the optical signals is necessary. Currently, this amplification is effected either by demultiplexing the different wavelengths and then converting the optical signals to corresponding electrical signals which are regenerated and then reconverted to optical signals or by using optical amplifiers, e.g. Erbium Doped Fiber Amplifiers (EDFA). Optical amplifiers do have the advantage of both relatively low cost and the ability to amplify all used wavelengths without the need for demultiplexing and optoelectronic regeneration.

WDM systems currently under development will have thirty or more channels, i.e., modulated optical signals with different wavelengths (known as Dense Wavelength Division Multiplexing, DWDM). These DWDM systems are demanding for optical amplifiers which, especially considering the cascadation of a plurality of optical amplifiers along the transmission path of the DWDM system, have only very limited tolerances in certain parameters. Among these parameters gain flatness and gain tilt are of special importance. Problems with gain tilt may arise from aging of the DWDM system, from temperature effects, from different attenuation slopes of fiber used to form the transmission path or from stimulated Raman scattering.

It is known that gain tilt and gain flatness of the optical amplifiers can be optimized by controlling the input power of the optical amplifier. In European Patent Application EP 0 637 148 A1, a WDM system is described wherein transmitters are used which have means for associating an identification signal with each transmitted wavelength and wherein each optical amplifier of the transmission path has means for determining from the identification signals the number of wavelengths present on the transmission path whereby to control the power of the different channels. The use of identification signals for each transmitted wavelength also allows for maintaining a power balance between different wavelength channels in order to maintain the necessary gain flatness. This is achieved by determination of the amplitudes of individual identification signals associated with the transmitted wavelengths.

The known WDM system has the disadvantage of associating an identification signal with each transmitted wavelength channel. In addition, it has the disadvantage that in WDM systems it is not guaranteed that every wavelength channel is present all the time. This causes problems if the amplitude of the individual identification signal normally associated with a missing wavelength channel is used to maintain gain flatness as described above.

SUMMARY OF THE INVENTION

Accordingly, it is an object of the present invention to provide a method and a system for controlling optical amplification in wavelength division multiplex optical transmission. It is one aim of the inventive method under consideration to avoid the drawbacks known from the state of the art.

According to the principles of the invention, there is provided a system and method for controlling optical amplification of an optical transmission signal consisting of a plurality of modulated optical signals with different wavelengths for wavelength division multiplex optical transmission. In one illustrative embodiment, a first auxiliary optical signal is added having a given power level at a wavelength shorter than the shortest wavelength of the optical transmission signal. A second auxiliary optical signal is added having the same power level as the first auxiliary optical signal at a wavelength longer than the longest wavelength of the optical transmission signal. The auxiliary optical signals are detected from the optical transmission signal after optical amplification thereof, and the optical amplification of the optical transmission signal is controlled depending on the difference between the power levels of the detected auxiliary optical signals.

An advantage of the present invention is that the method and system described herein are insensitive to the absence of wavelength channels, e.g., the failure of certain wavelengths or optical signals forming the optical transmission signal. It is another advantage of the present invention that it allows to reduce the number of identification signals necessary.

The present invention will become more fully understood from the detailed description given hereinafter and further scope of applicability of the present invention will become apparent. However, it should be understood that the detailed description is given by way of illustration only, since various changes and modifications within the spirit and scope of the invention will become apparent to those skilled in the art.

BRIEF DESCRIPTION OF THE DRAWING

The following detailed description is accompanied by the drawing of which

Identical denotations in different figures represent identical elements. Bold lines connecting the depicted elements of the figures represent optical connections, e.g., with optical fibers, other connections are electrical connections.

DETAILED DESCRIPTION

Figure 1:
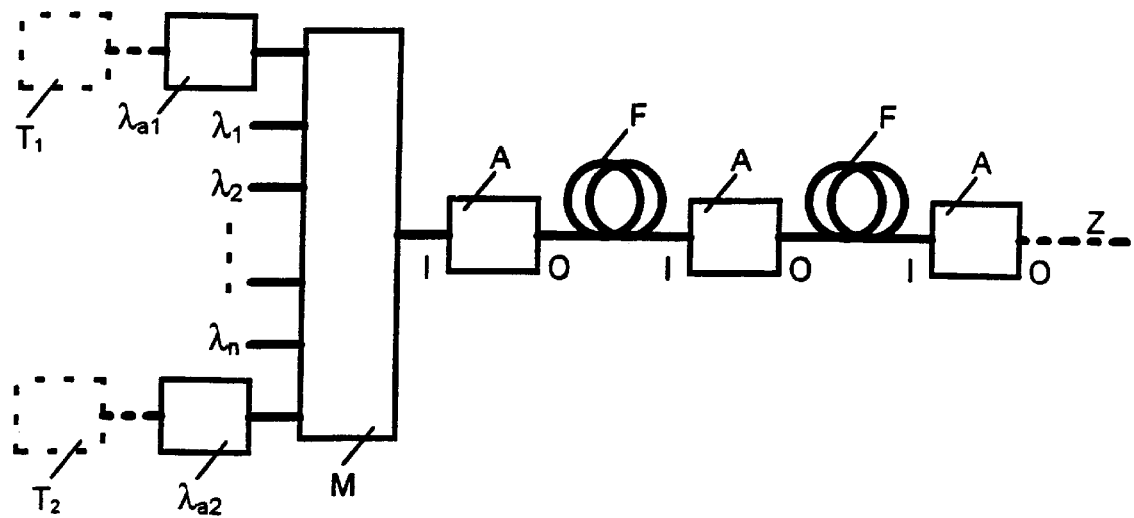
FIG. 1 is a schematic representation of a first embodiment of a wavelength division multiplex system according to this invention.

Depicted in FIG. 1 is a first embodiment of the present invention, comprising a wavelength division multiplex optical transmission system. It comprises a means for combining optical signals M, e.g., a wavelength division multiplexer, which forms an optical transmission signal of modulated optical signals $\lambda_1 \ldots \lambda_n$ at different wavelengths and connected to the inputs of the wavelength division multiplexer M.

Figure 7:
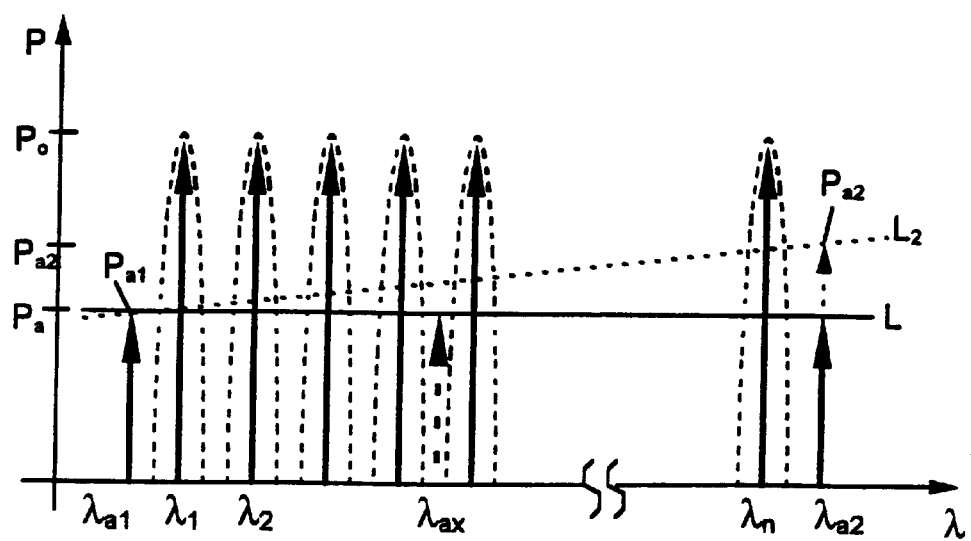
FIG. 7 shows the power levels of optical signals and auxiliary optical signals according to this invention.

Connected to two additional inputs are means $\lambda_{a1}$ and $\lambda_{a2}$ for producing auxiliary optical signals, e.g., lasers. The wavelength of the first laser $\lambda_{a1}$ is shorter than the shortest wavelength used in the WDM system. The wavelength of the second laser $\lambda_{a2}$ is longer than the longest wavelength used in the WDM system. The power level of the auxiliary optical signals produced by the lasers $\lambda_{a1}$ and $\lambda_{a2}$ is equal. The auxiliary optical signals are combined by the wavelength division multiplexer M with the optical signals $\lambda_1 \ldots \lambda_n$ to form the optical transmission signal which is available at the output of the wavelength division multiplexer M. Referring to FIG. 7, the power level $P_a$ of the auxiliary optical signals $\lambda_{a1}$ and $\lambda_{a2}$ may be lower than the power level $P_o$ of the optical signals $\lambda_1 \ldots \lambda_n$ to not influence the power budget of the WDM system.

It is also possible to add the auxiliary optical signals with an additional means for combining optical signals, e.g., directly after wavelength division multiplexer M, with the help of a coupler or a circulator, or at any other position of the transmission path. To achieve the best results, it is advantageous to add the auxiliary optical signals at the beginning of the transmission path.

The optical transmission signal is fed to an input I of a controlled optical amplifier A which amplifies the optical transmission signal. The amplified optical transmission signal is available at an output O of the controlled amplifier A. The transmission signal is then transmitted through an optical fiber F. After a certain fiber length, e.g., 100 km, another controlled optical amplifier A is connected to the optical fiber F. Many stages comprising an optical fiber F and a controlled amplifier A may follow as indicated by denomination Z. Finally, a demultiplexer and receivers for the optical transmission signal are connected to the system. For reason of clarity, the demultiplexer and the receivers are not shown.

The principle of the present invention is shown in FIG. 7. The power levels of the auxiliary optical signals $\lambda_{a1}$ and $\lambda_{a2}$ were equal at $P_a$ when they were added to the optical transmission signal $\lambda_1 \ldots \lambda_n$, they should be equal after optical amplification, too. If a difference in the power levels of the auxiliary optical signals is present after amplification, e.g., for as shown with a dashed line for the second auxiliary optical signal $\lambda_{a2}$ having a power level of $P_{a2}$, gain tilt has to be corrected. This can be effected with the controlled optical amplifier A. The difference of the power levels of the auxiliary optical signals ($P_{a1}$-$P_{a2}$) is an unambiguous measure for the slope of a line $L_2$ passing through the power level of the auxiliary signals of the first and second auxiliary optical signal $\lambda_{a1}$ and $\lambda_{a2}$.

Figure 2:
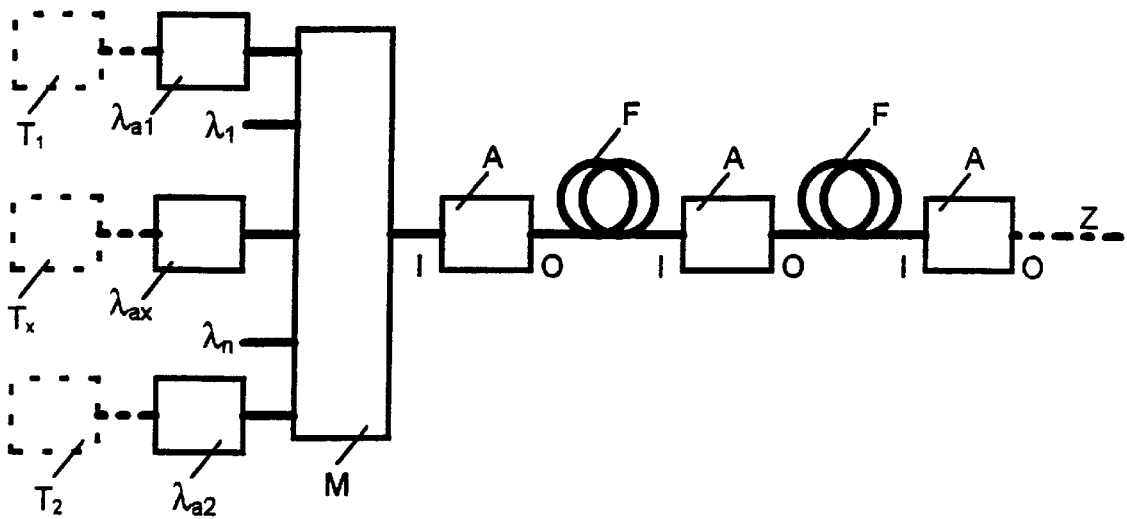
FIG. 2 is a schematic representation of a second embodiment of a wavelength division multiplex system according to this invention.

Depicted in FIG. 2 is a second embodiment of the present invention, comprising a wavelength division multiplex optical transmission system which is identical to the system as shown in FIG. 1 and explained above. In difference to FIG. 1, an additional means $\lambda_{ax}$ for producing an auxiliary optical signal, e.g., a laser, is added. The wavelength of the auxiliary optical signal produced by laser $\lambda_{ax}$ can range from the shortest to the longest wavelength of the optical transmission signal of the WDM system. It is advantageous to choose a wavelength which is not used by optical signals of the WDM system, as shown in FIG. 7. It is also possible to use a wavelength normally used in the WDM systems by an optical signal for the auxiliary optical signal which then substitutes the optical signal. It is also possible to use more than one additional auxiliary signal within the bandwidth of the optical transmission signal of the WDM system. The power level of the auxiliary optical signal produced by laser B equals the power level of the auxiliary optical signals described above. With additional auxiliary optical signals it is also possible to control gain flatness.

Depicted with dashed lines in FIGS. 1 and 2 are pilot tone generators $T_1$, $T_2$, and $T_x$ connected to the lasers $\lambda_{a1}$, $\lambda_{a2}$ and $\lambda_{ax}$. The auxiliary optical signals produced by the lasers $\lambda_{a1}$, $\lambda_{a2}$ and $\lambda_{ax}$ are modulated with the pilot tones from the generators $T_1$, $T_2$ and $T_x$. The pilot tones, which have different, individual frequencies, are used for detecting the power of the auxiliary optical signals by their amplitudes and will be explained with reference to FIGS. 3 and 4.

Figure 3:
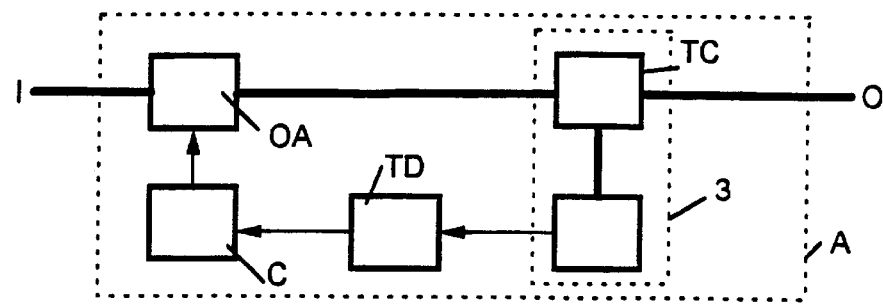
FIG. 3 is a schematic representation of a first embodiment of a controlled optical amplifier according to this invention.

Depicted in FIG. 3 is a first embodiment of a controlled optical amplifier A, as described above, with an input I and an output O for the optical transmission signal. This first embodiment uses the pilot tones described above. The controlled optical amplifier A comprises an optical amplifier OA, means 3, TD for detecting the pilot tones modulated to the auxiliary optical signals from the optical transmission signal after amplification of the optical transmission signal and a controlling means C to control the optical amplifier OA. The input I of the controlled optical amplifier A forms the input of the optical amplifier OA which is optically connected to the input of means 3 for detecting the auxiliary optical signals. The output of means 3 forms the output O of the controlled optical amplifier A.

The means 3 for detecting the auxiliary optical signals comprises a tap coupler TC and a photo detector PD. The tap coupler TC is connected to the output of the optical amplifier OA and is coupling out a small amount of the energy of the optical transmission signal. The out coupled optical transmission signal is fed to the photo detector PD which in turn is coupled to TD.

As the auxiliary optical signals were modulated with the individual pilot tones, as described above, the electrical signal contains the different frequencies of the pilot tones used. With the help of a pilot tone detection circuit TD, the different pilot tones can be detected. A controlling means C forms the difference of the power levels from the auxiliary signals. If there is no difference or a difference smaller than a given threshold, no corrections are necessary. If there is a difference or the given threshold is exceeded, the controlling means C corrects the optical amplifier OA until the measured difference vanishes. The correction of the optical amplifier OA can be achieved by controlling the inversion, e.g., by controlling the pump power of the optical amplifier OA or by using a variable optical attenuator within the optical amplifier OA. The correction of an optical amplifier is described in more detail for example in European Patent Application EP 0 782 225 A2.

To avoid negative effects to optical amplifiers used in the WDM system, the frequencies of the pilot tones used should be higher than the reciprocal of the time constant of optical amplifiers used. In addition, it has to be avoided that spectral parts of the optical transmission signals of the WDM system overlap with pilot tone frequencies. If the optical transmission signal is optically separated, as will be explained afterwards, no spectral problems arise.

Figure 4:
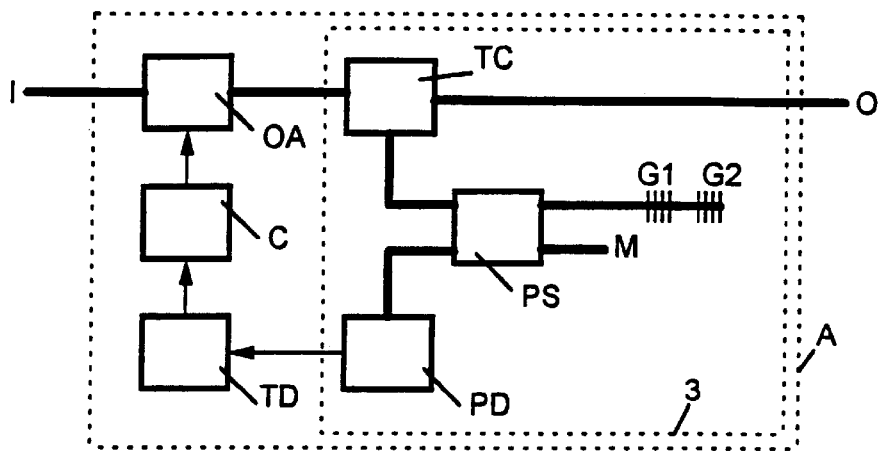
FIG. 4 is a schematic representation of a second embodiment of a controlled optical amplifier according to this invention.

Depicted in FIG. 4 is a second embodiment of a controlled optical amplifier A, as described above, with an input I and an output O for the optical transmission signal. This second embodiment uses the pilot tones described above. The controlled optical amplifier A comprises an optical amplifier OA, means 3, TD for detecting the pilot tones modulated to the auxiliary optical signals from the optical transmission signal after amplification of the optical transmission signal and a controlling means C to control the optical amplifier OA. The input I of the controlled optical amplifier A forms the input of the optical amplifier OA which is optically connected to the input of means 3 for detecting the auxiliary optical signals. The output of means 3 forms the output O of the controlled optical amplifier A.

The means 3 for detecting the auxiliary optical signals comprises a tap coupler TC, a power splitter PS, gratings G1 and G2 and a photo detector PD. The tap coupler TC is connected to the output of the optical amplifier OA and is coupling out a small amount of the energy of the optical transmission signal. The out coupled optical transmission signal is fed to a first port of the power splitter PS. To a second port of the power splitter PS gratings G1 and G2, e.g., Bragg- or fiber-Bragg-gratings, are connected in series. Grating G1 is a reflector for the auxiliary optical signal of laser $\lambda_{a1}$, grating G2 is a reflector for the auxiliary optical signal of laser $\lambda_{a2}$. The reflected auxiliary signals are available at a third port of the power splitter PS. At a fourth port M of the power splitter PS, the output power of the optical amplifier OA is available and could be monitored. The third port of the power splitter PS is connected to the photo detector PD which transforms the auxiliary optical signals to an electrical signal. As the auxiliary optical signals were modulated with the individual pilot tones, as described above, the electrical signal contains the different frequencies of the pilot tones used. With the help of a pilot tone detection circuit TD, the different pilot tones can be detected. A controlling means C forms the difference of the power levels from the auxiliary signals. If there is no difference or a difference smaller than a given threshold, no additional corrections are necessary. If there is a difference or the difference exceeds the given threshold, the controlling means C corrects the optical amplifier OA until the measured difference vanishes. The correction of the optical amplifier OA can be achieved by controlling, e.g. the pump power of the optical amplifier OA. The correction of an optical amplifier is described in more detail for example in EP 0 782 225 A2.

Figure 5:
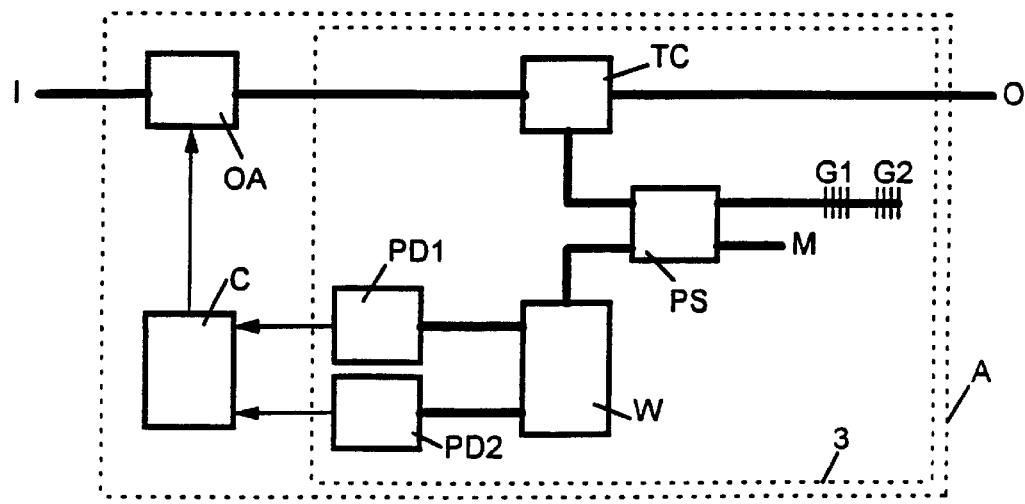
FIG. 5 is a schematic representation of a third embodiment of a controlled optical amplifier according to this invention.

FIG. 5 depicts a third embodiment of a controlled optical amplifier A according to the present invention. The controlled amplifier A is detecting the auxiliary optical signals by optical means. Therefore the use of pilot tone generators as shown in FIGS. 1 and 2 by dashed lines is not necessary. The controlled optical amplifier A comprises an optical amplifier OA, means 3 for detecting the auxiliary optical signals from the optical transmission signal after amplification of the optical transmission signal and a controlling means C to control the optical amplifier OA. The input I of the controlled optical amplifier A forms the input of the optical amplifier OA which is optically connected to the input of means 3 for detecting the auxiliary optical signals. The output of means 3 forms the output O of the controlled optical amplifier A.

The means 3 for detecting the auxiliary optical signals comprises a tap coupler TC, a power splitter PS, gratings G1 and G2, a wavelength division multiplexer W and photo detectors PD1 and PD2. The tap coupler TC is connected to the output of the optical amplifier OA and is coupling out a small amount of the energy of the optical transmission signal. The out coupled optical transmission signal is fed to a first port of the power splitter PS. To a second port of the power splitter PS gratings G1 and G2, e.g., Bragg- or fiber-Bragg-gratings, are connected in series. Grating G1 is a reflector for the auxiliary optical signal of laser $\lambda_{a1}$, grating G2 is a reflector for the auxiliary optical signal of laser $\lambda_{a2}$. The reflected auxiliary signals are available at a third port of the power splitter PS. At a fourth port M of the power splitter PS, the output power of the optical amplifier OA is available and could be monitored. The third port of the power splitter PS is connected to the wavelength division multiplexer W which separates the auxiliary optical signals which are then fed to the photo detectors PD1 and PD2 which transform the auxiliary optical signals to electrical signals. A controlling means C forms the difference of the power levels from the electrical auxiliary signals made available by photo detectors PD1 and PD2. If there is no difference or a difference smaller than a given threshold, no additional corrections are necessary. If there is a difference or the difference exceeds the given threshold, the controlling means C corrects the optical amplifier OA until the measured difference vanishes. The correction of the optical amplifier OA can be achieved by controlling, e.g., the pump power of the optical amplifier OA. The correction of an optical amplifier is described in more detail for example in EP 0 782 225 A2.

Figure 6:
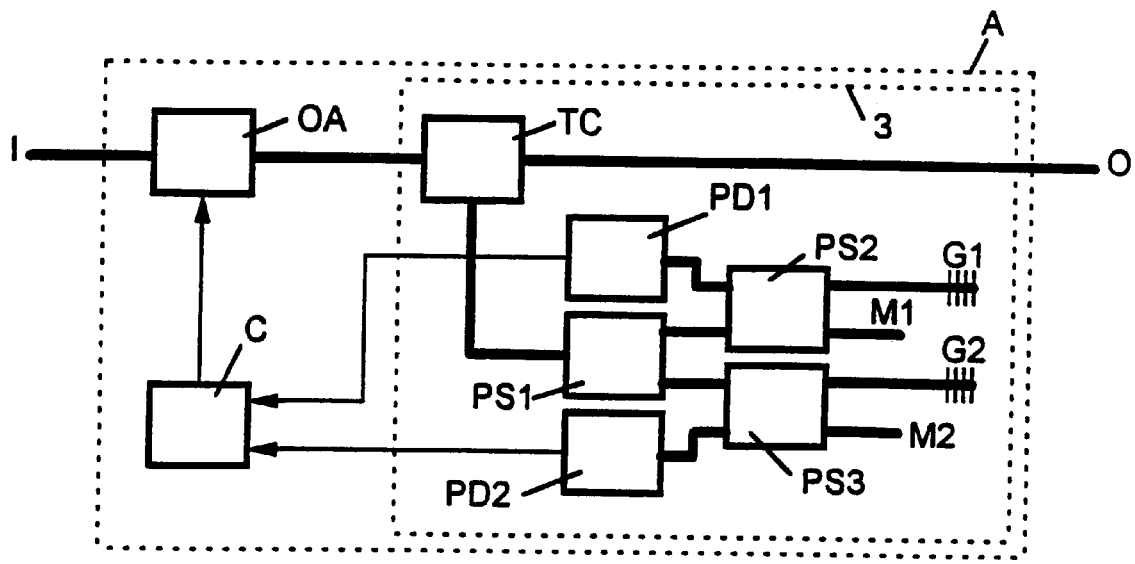
FIG. 6 is a schematic representation of a fourth embodiment of a controlled optical amplifier according to this invention.

FIG. 6 depicts a fourth embodiment of a controlled optical amplifier A according to the present invention. This controlled amplifier A is detecting the auxiliary optical signals by optical means. Therefore the use of pilot tone generators as shown in FIGS. 1 and 2 by dashed lines is not necessary. The controlled optical amplifier A comprises an optical amplifier OA, means 3 for detecting the auxiliary optical signals signal and a controlling means C to control the optical amplifier OA. The input I of the controlled optical amplifier A forms the input of the optical amplifier OA which is optically connected to the input of means 3 for detecting the auxiliary optical signals. The output of means 3 forms the output O of the controlled optical amplifier A.

The means 3 for detecting the auxiliary optical signals comprises a tap coupler TC, three power splitters PS1, PS2, and PS3, gratings G1 and G2 and photo detectors PD1 and PD2. The tap coupler TC is connected to the output of the optical amplifier OA and is coupling out a small amount of the energy of the optical transmission signal. The out coupled optical transmission signal is fed to a first port of the first power splitter PS1. To a second and third port of the first power splitter PS1, the second and third power splitters PS2 respectively PS3 are connected with a third respectively first port. To a second port of the second power splitter PS2, a grating GI, e.g., Bragg- or fiber-Bragg-grating, is connected. Grating G1 is a reflector for the auxiliary optical signal of laser $\lambda_{a1}$. To a second port of the third power splitter PS3 a grating G2, e.g., Bragg- or fiber-Bragg-grating, is connected. Grating G2 is a reflector for the auxiliary optical signal of laser $\lambda_{a2}$. The reflected auxiliary optical signal of laser $\lambda_{a1}$ is available at a first port of the second power splitter PS2 which is connected to the first photo detector PD1. The reflected auxiliary optical signal of laser $\lambda_{a2}$ is available at a third port of the third power splitter PS3 which is connected to the second photo detector PD2. At fourth ports M1 and M2 of the second and third power splitters, PS2 respectively PS3 the output power of the optical amplifier OA is available and could be monitored. A controlling means C forms the difference of the power levels from the electrical auxiliary signals made available by photo detectors PD1 and PD2. If there is no difference or a difference smaller than a given threshold, no additional measurements are necessary. If there is a difference or the difference exceeds the given threshold, the controlling means C corrects the optical amplifier OA until the measured difference vanishes. The correction of the optical amplifier OA can be achieved by controlling, e.g., the pump power of the optical amplifier OA. The correction of an optical amplifier is described in more detail for example in EP 0 782 225 A2.

For all above described embodiments of controlled optical amplifiers A, it should be noted, that if, as depicted in FIG. 2, additional auxiliary optical signals $\lambda_{ax}$ are applied, additional elements like gratings or photo detectors have to be present in the means 3 for detecting the auxiliary optical signals.

What is claimed is:

1. A method for controlling optical amplification of an optical transmission signal including a plurality of optical signals modulated with different wavelengths for wavelength division multiplex optical transmission, comprising the steps of:

adding a first auxiliary optical signal having a given power level at a wavelength shorter than the shortest wavelength of the optical transmission signal;

adding a second auxiliary optical signal having the same power level as the first auxiliary optical signal at a wavelength longer than the longest wavelength of the optical transmission signal;

detecting the auxiliary optical signals from the optical transmission signal after optical amplification thereof; and controlling the optical amplification of the optical transmission signal depending on the difference between the power levels of the detected auxiliary optical signals.

2. The method according to claim 1, further comprising the step of adding at least one other auxiliary optical signal having the given power level at a wavelength ranging from the shortest to the longest wavelength of the optical transmission signal.

3. The method according to claim 2, wherein the at least one other auxiliary optical signal is added at a wavelength not used for the modulation of optical signals.

4. The method according to claim 2, wherein the at least one other auxiliary optical signal is added instead of an optical signal at a wavelength thereof.

5. The method according to claim 1 wherein each of the auxiliary optical signals is modulated with an individual tone.

6. The method according to claim 2 wherein each of the auxiliary optical signals is modulated with an individual tone.

7. A system for controlling optical amplification of an optical transmission signal consisting of a plurality of optical signals modulated with different wavelengths for wavelength division multiplex optical transmission, formed by at least one means for combining optical signals comprising:

a first means, connected to the means for combining optical signals, for producing a first auxiliary optical signal having a given power level at a wavelength shorter than the shortest wavelength of the optical transmission signal;

a second means, connected to the means for combining optical signals, for producing a second auxiliary optical signal having the same power level as the first auxiliary optical signal at a wavelength longer than the longest wavelength of the optical transmission signal;

a third means for detecting the auxiliary optical signals from the optical transmission signal and determining the power levels of the auxiliary optical signals after optical amplification thereof with an optical amplifier; and a controlling means for controlling the optical amplifier depending on the difference between the power levels of the auxiliary optical signals.

8. The system according to claim 7, further comprising at least one additional means, connected to the means for combining optical signals, for producing at least one other auxiliary optical signal having the given power level at a wavelength ranging from the shortest to the longest wavelength of the optical transmission signal.

9. The system according to claim 8, wherein the at least one other auxiliary optical signal has a wavelength not used for the modulation of optical signals.

10. The system according to claim 8, wherein the at least one other auxiliary optical signal has a wavelength of an optical signal.

11. The system according to claim 7, wherein the means for combining optical signals comprises a wavelength division multiplexer.

12. The system according to claim 10, wherein the means for combining optical signals comprises a wavelength division multiplexer.

13. The system according to claim 7, further comprising a pilot tone generator, connected to each means for producing the auxiliary optical signals, for modulating each of the auxiliary optical signals with an individual pilot tone.

14. The system according to claim 8, further comprising a pilot tone generator, connected to each means for producing the auxiliary optical signals, for modulating each of the auxiliary optical signals with an individual pilot tone.

15. The system according to claim 13, wherein the third means for detecting the auxiliary optical signals comprises:

a coupler connected to the output of the optical amplifier;

a power splitter connected to the coupler;

wavelength selective reflectors, connected to the power splitter, for reflecting the auxiliary optical signals;

a photo detector connected to the power splitter; and a pilot tone detector for detecting the auxiliary signals.

16. The system according to claim 13, wherein the third means for detecting the auxiliary optical signals comprises:

a coupler connected to the output of the optical amplifier;

a photo detector connected to the power splitter; and a pilot tone detector for detecting the auxiliary signals.

17. The system according to claim 7, wherein the third means for detecting the auxiliary optical signals comprises:

a coupler connected to the output of the optical amplifier;

a power splitter connected to the coupler;

wavelength selective reflectors, connected to the power splitter, for reflecting the auxiliary optical signals;

a wavelength division multiplexer for separating the auxiliary optical signals; and photo detectors connected to the wavelength division multiplexer.

18. The system according to claim 11, wherein the third means for detecting the auxiliary optical signals comprises:

a coupler connected to the output of the optical amplifier;

a power splitter connected to the coupler;

wavelength selective reflectors, connected to the power splitter, for reflecting the auxiliary optical signals;

a wavelength division multiplexer for separating the auxiliary optical signals; and photo detectors connected to the wavelength division multiplexer.

19. The system according to claim 7, wherein the third means for detecting the auxiliary optical signals comprises:

a coupler connected to the output of the optical amplifier;

a first power splitter connected to the coupler;

additional power splitters connected to the first power splitter;

wavelength selective reflectors, connected to the additional power splitters, for reflecting the auxiliary optical signals; and photo detectors connected to the additional power splitters.

20. The system according to claim 11, wherein the third means for detecting the auxiliary optical signals comprises:

a coupler connected to the output of the optical amplifier;

a first power splitter connected to the coupler;

additional power splitters connected to the first power splitter;

wavelength selective reflectors, connected to the additional power splitters, for reflecting the auxiliary optical signals; and photo detectors connected to the additional power splitters.

* * * * *